US008559298B2

(12) United States Patent
Catovic et al.

(10) Patent No.: US 8,559,298 B2
(45) Date of Patent: Oct. 15, 2013

(54) METHOD AND APPARATUS FOR AUTOMATIC HANDOVER OPTIMIZATION

(75) Inventors: Amer Catovic, San Diego, CA (US); Andrea Garavaglia, Nuremberg (DE); Sunil S. Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 957 days.

(21) Appl. No.: 12/491,123

(22) Filed: Jun. 24, 2009

(65) Prior Publication Data

US 2009/0323638 A1 Dec. 31, 2009

Related U.S. Application Data

(60) Provisional application No. 61/077,064, filed on Jun. 30, 2008.

(51) Int. Cl.
*H04W 4/00* (2009.01)

(52) U.S. Cl.
USPC ........... 370/216; 370/242; 370/331; 370/503; 455/436

(58) Field of Classification Search
None
See application file for complete search history.

(56) References Cited

U.S. PATENT DOCUMENTS

| | | | |
|---|---|---|---|
| 5,722,072 A | 2/1998 | Crichton et al. | |
| 5,920,607 A * | 7/1999 | Berg | 379/1.01 |
| 6,400,953 B1 | 6/2002 | Furukawa | |
| 7,535,824 B2 * | 5/2009 | Wallenius | 370/216 |
| 2001/0051524 A1 | 12/2001 | Hunzinger | |
| 2002/0068566 A1 | 6/2002 | Ohlsson et al. | |
| 2003/0002525 A1 * | 1/2003 | Grilli et al. | 370/465 |
| 2003/0114159 A1 * | 6/2003 | Park et al. | 455/436 |
| 2003/0119508 A1 | 6/2003 | Gwon et al. | |
| 2006/0046735 A1 * | 3/2006 | Gross et al. | 455/452.2 |
| 2006/0142021 A1 | 6/2006 | Mueckenheim et al. | |
| 2006/0160539 A1 * | 7/2006 | Juan et al. | 455/436 |
| 2006/0187869 A1 | 8/2006 | Czaja et al. | |
| 2009/0163223 A1 * | 6/2009 | Casey | 455/453 |
| 2010/0165836 A1 * | 7/2010 | Wahlqvist et al. | 370/225 |
| 2011/0026492 A1 * | 2/2011 | Frenger et al. | 370/331 |

FOREIGN PATENT DOCUMENTS

| | | |
|---|---|---|
| JP | 11122654 A | 4/1999 |
| JP | 2002044702 A | 2/2002 |
| JP | 2005311626 A | 11/2005 |
| JP | 2006191592 A | 7/2006 |
| JP | 2007282252 A | 10/2007 |
| JP | 2008042764 A | 2/2008 |
| JP | 2008172373 A | 7/2008 |
| WO | WO03105520 | 12/2003 |
| WO | WO2008016885 | 2/2008 |

OTHER PUBLICATIONS

International Search Report and Written Opinion—PCT/US2009/049309—ISA/EPO—Oct. 12, 2009.

* cited by examiner

*Primary Examiner* — Chi Pham
*Assistant Examiner* — Shick Hom
(74) *Attorney, Agent, or Firm* — Florin Corie

(57) ABSTRACT

A method for wireless communications is provided. The method includes determining a set of handover parameters that facilitate a handover between cells in a wireless network and analyzing the set of handover parameters. The method includes dynamically adjusting the parameters to mitigate handover failures between the cells.

28 Claims, 12 Drawing Sheets

METHOD AND APPARATUS FOR AUTOMATIC HANDOVER OPTIMIZATION

CLAIM OF PRIORITY UNDER 35 U.S.C. §119

This application claims the benefit of U.S. Provisional Patent Application No. 61/077,064, entitled METHOD AND APPARATUS FOR AUTOMATIC HANDOVER OPTIMIZATION, and filed on Jun. 30, 2008, the entirety of which is incorporated herein by reference.

BACKGROUND

I. Field

The following description relates generally to wireless communications systems, and more particularly to optimizing parameters that facilitate automated wireless handover performance between nodes.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

One aspect of wireless communications relates to the concept of handover that refers to the act of switching serving cells from one station to another during communications with user equipment such as a mobile device. For instance, handover can occur during mobility situations when a device leaves one service location and enters another. The ideal handover scenario is when service is handed over from one station to another without any loss or disruption to the current communications path. Unfortunately, various handover failures can occur with present systems. Such failures include radio link failures and call drops for example. Some of these failures relate to handover network parameters that are manually configured or improperly controlled. When these parameters are not optimally configured, handover failures can occur. The respective failures generally fall in to four main categories: Handovers that occur too early; handovers that occur too late; handovers that are not triggered properly; and handover that bounce back and forth between stations which is sometimes referred to as "ping-ponging."

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods control automatic handover operations between stations in a wireless network. Various handover parameters are identified and controlled in an automated manner in order to facilitate handover performance. By controlling the respective parameters, handover failures are mitigated. In general, the handover parameters are monitored and dynamically adjusted as conditions dictate where the parameters impact the timing and hence the quality of efficient handovers between stations. Thus, automatic control of the parameters mitigates or minimizes handovers that occur too early or that occur too late. A subset of these timing problems that are also mitigated by tight parameter control include handovers that are not triggered properly and handovers that may bounce back and forth between stations and respective switchover states. Some exemplary handover parameters that can be optimized include time-to-trigger (TTT) parameters, offset parameters, and Cell Individual Offsets (CIO), for example. Other parameters can also be optimized that may be indirectly affected by parameters such as offset. When the parameters have been sampled, measured, analyzed, and dynamically adjusted for a given cell, handover failures can be reduced.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate reliable handover operations in a wireless communications system. In one aspect, a method for wireless communications is provided. The method includes employing a processor executing computer executable instructions stored on a computer readable storage medium to implement various acts or processes. The method includes determining a set of handover parameters that facilitate a handover between cells in a wireless network and analyzing the set of handover parameters. The method includes dynamically adjusting the parameters to mitigate handover failures between the cells.

Figure 1:
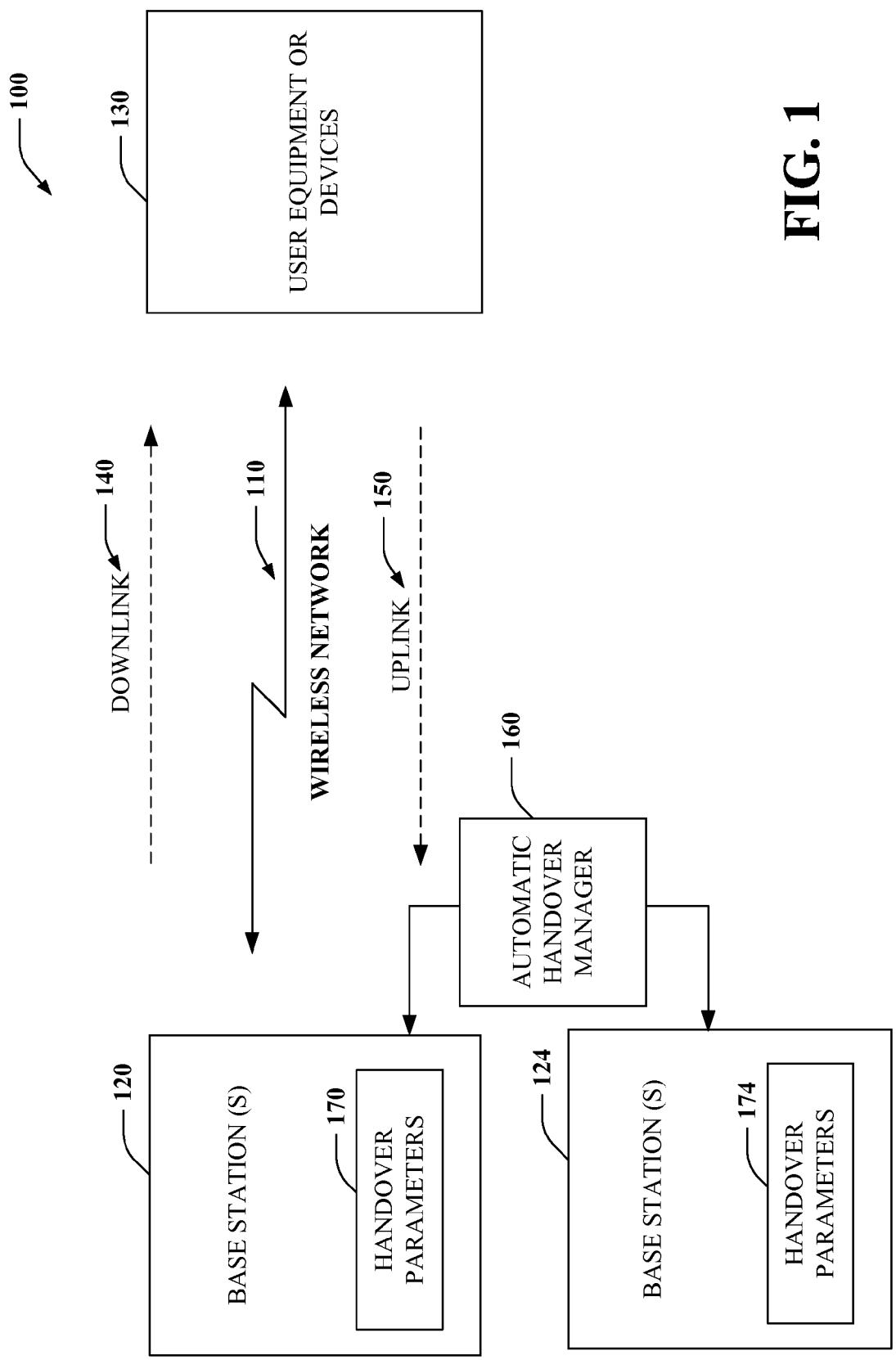
FIG. 1 is a high level block diagram of a system that provides automatic handover operations and parameter optimizations for a wireless communications system

Referring now to FIG. 1, a system 100 provides automatic handover operations and parameter optimizations for a wireless communications system, where the options are employed to increase the efficiency or reliability of cell handover between stations, devices, or channels. The system 100 includes one or more base stations 120, 124 (also referred to as a node, evolved node B—eNB, femto station, pico station, and so forth) which can be an entity capable of communication over a wireless network 110 to a second device 130 (or devices). For instance, each device 130 can be an access terminal (also referred to as terminal, user equipment, station or mobile device). The base stations 120 or 124 communicate to the device 130 via downlink 140 and receive data via uplink 150. Such designation as uplink and downlink is arbitrary as the device 130 can also transmit data via downlink and receive data via uplink channels. It is noted that although three components 120, 124, and 130 are shown, that more than three components can be employed on the network 110, where such additional components can also be adapted for the wireless processing and handover operations described herein.

Figure 2:
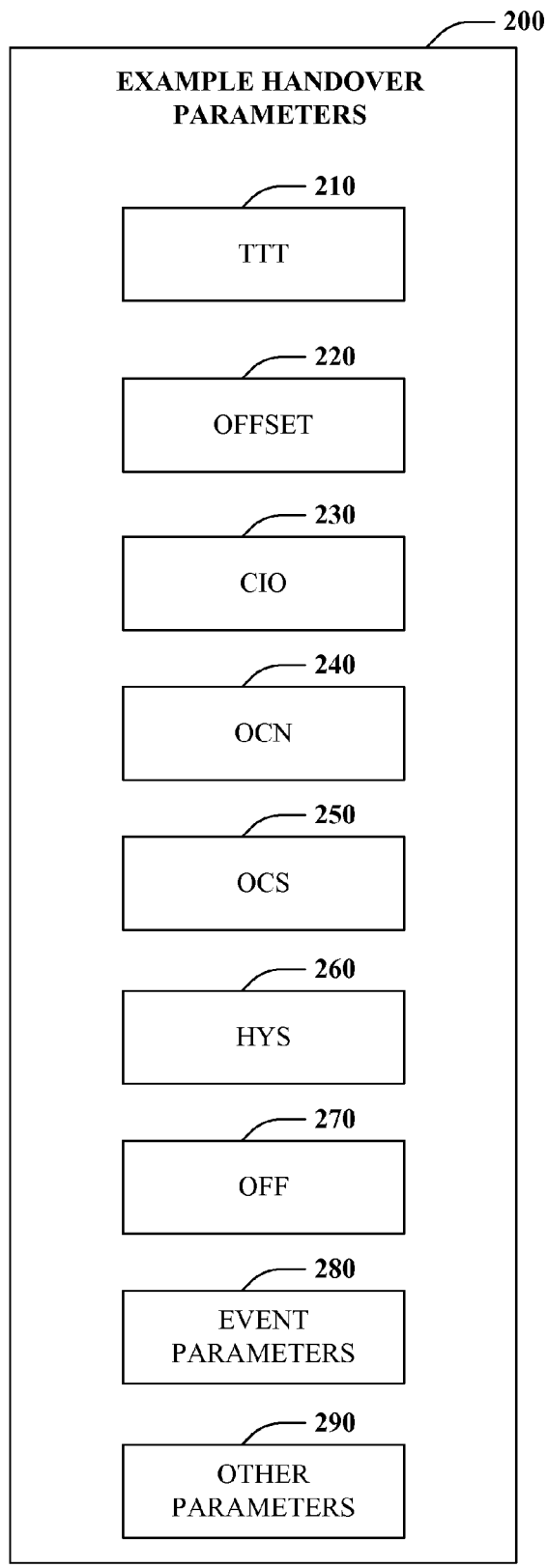
FIG. 2 is a diagram that illustrates example handover parameters for a wireless system.
Figure 3:
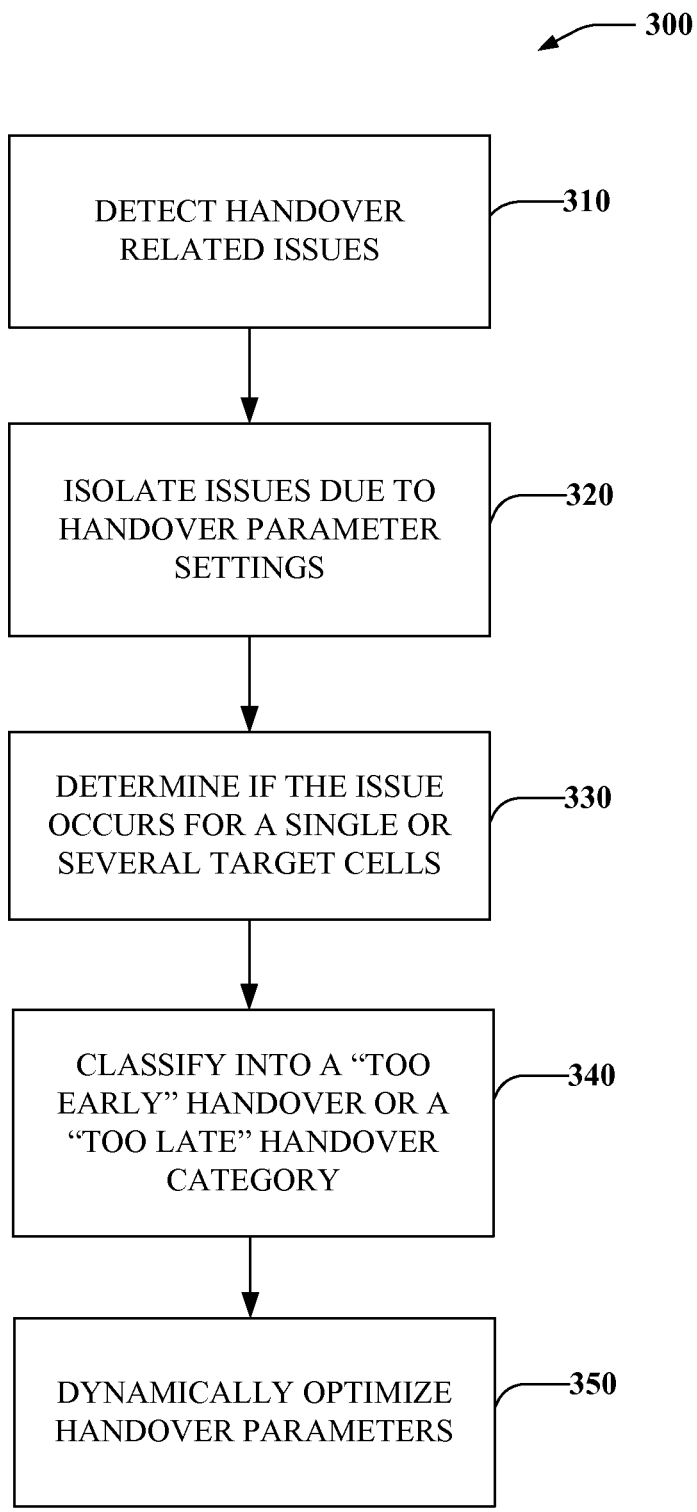
FIG. 3 is a flow diagram of an example process for controlling handover parameters in a wireless communication system.

As shown, an automatic handover manager 160 is provided to analyze and dynamically adjust one or more handover parameters 170 and 174 that are employed by the respective stations 120 and 124 to handover or switch control states between stations that provide wireless service to the device or devices 130. Although a separate handover entity 160 is shown to facilitate automatic handover between the stations 120 and 124, it is to be appreciated that other arrangements are possible. For example, automatic handover functionality could exist on one or more of the base stations 120, 124 or be divided amongst the respective stations. Moreover, the user equipment 130 could also include one or more aspects of automated handover parameter identification, measurement, and/or dynamic adjustment. Example architectures will be described in more detail below with respect to FIG. 5 regarding possible logical arrangements for the functionality provided by the handover manager 160 which can include all or portions of the functional processing aspects for automated handover. FIG. 2 will provide a more detailed description of example handover parameters 170, 174 that can be optimized dynamically and FIG. 3 provides a method describing the logical processing aspects for the parameters provided by handover manager 160.

In general, the handover parameters 170 and 174 are identified and controlled in an automated manner in order to facilitate handover performance. By controlling the respective parameters, handover failures are mitigated. In general, the handover parameters 170 and 174 are monitored and dynamically adjusted by the handover manager 160 as conditions dictate or indicate where the parameters impact the timing and hence the quality of efficient handovers between stations 120 and 124. Thus, automatic control of the parameters mitigates or minimizes handovers that occur too early or that occur too late. A subset of these timing problems that are also mitigated by tight parameter control include handovers that are not triggered properly and handovers that may bounce back and forth between stations and respective switchover states. Some exemplary handover parameters that can be optimized include time-to-trigger (TTT) parameters, offset parameters, and Cell Individual Offsets (CIO), for example. Other parameters can also be optimized that may be indirectly affected by parameters such as offset. When the parameters have been sampled, measured, analyzed, and dynamically adjusted for a given cell, handover failures can be reduced. The parameters are described in more detail below with respect to FIG. 2.

Before proceeding, some of the control and optimizations provided by the system 100 are described. These include handover optimization by means of handover parameter optimization as described above. This includes handover optimization by detecting handover-related issues such as switching too early or too late between cells. Various measurements provide means for detecting handover-related issues, where handover optimization can occur by isolating issues due to improper handover parameter settings. Thus, systems and methods provide means for detecting issues due to handover parameter settings. This includes determining if the issue occurs for a single or several target cells and includes means for detecting if the issue occurs for a single or several target cells. As noted previously, handover optimization can occur by detecting too early and too late handovers, where means are provided for detecting such early and late events. Detections can be based on user equipment measurement reports, where parameters can be categorized into Offset/CIO/TTT groups, for example. This also includes detecting the handover parameter to optimize and a logical processing matrix for optimizing the parameters.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g. communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Referring now to FIG. 2, a diagram 200 illustrates example handover parameters for a wireless system. At 210, on example parameter includes time-to-trigger (TTT) (for serving cell). Another parameter 200 includes offset 220 which is a time offset for the serving cell and a Cell Individual Offset (CIO) 230 (for each serving cell—neighbor cell pair). These parameters can be automatically controlled and optimized. Other parameters that can be indirectly controlled include OCN 240 where OCN=CIO−Hys. At 250, OCS is another parameter where (OCS=Offset−Off). In general, OCN 240 is a cell-specific offset of a neighboring cell, where OCS 250 is cell-specific offset of a serving cell. HYS is a hysteresis parameter 260 for a handover event and OFF 270 is an offset parameter for the respective event. In general, HYS 260 is fixed for a given event and cannot be configured on a per-cell basis, i.e., it cannot be optimized for individual cells. On the other hand, OCN 240 is configurable for each serving cell-neighbor cell pair. Thus, CIO is defined as OCN−Hys which can be considered as configurable and optimizable for each serving cell-neighbor cell pair. Also, OFF 270 is fixed for a given event and cannot be configured on a per-cell basis. OCS 250 is configurable for each serving cell. Thus, Offset can be defined as Ocn+Off which can be optimized on a per-cell basis. Other event parameters may include measurement parameters such as measurement strength and measurement results. Other parameters 290 that may be influenced by dynamically adjustable parameters include frequency specific offsets for serving and neighboring cells. As can be appreciated, other parameters than illustrated at 200 can be dynamically monitored and adjusted.

Referring now to FIG. 3, a wireless communication methodology 300 for automatic handover parameter optimization is illustrated. While, for purposes of simplicity of explanation, the methodology (and other methodologies described herein) are shown and described as a series of acts, it is to be understood and appreciated that the methodology is not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter. In general, the process 300 can be implemented as processor instructions, logical programming functions, or other electronic sequence that supports automatic handover control and parameter optimizations described herein.

FIG. 3 is an example scrambling sequence extension process 300 for a wireless communication system. At 310, handover related issues are detected. This includes observing performance measurements (PM) and other indicators of handover-related issues. Inputs for this process (or logical function) include PM and other indicators related to handover success/failure rate. The PM and other indicators of call drops, call setup failures and Radio Link Failures occurring during handover procedures are also considered and processed. This includes the PM and other indicators of call drops, call setup failures and Radio Link Failures occurring soon after handovers and other indicators of call drops, call setup failures and Radio Link Failures occurring in the neighboring cells. The PM and other indicators related to low number of handovers compared to peer cells and compared to expectations are analyzed and processed including alarms related to handover failures. If handover issues are detected trigger the process act at 320.

Proceeding to 320, issues related to handover parameter settings are isolated. This includes observing PM and other indicators of handover-related issues that are not due to handover parameters. The remaining handover-related issues detected by act 310 are due to handover parameter issues. The inputs for this processing stage include PM and other indicators related to handover failures due to: Resource reservation failures in the target eNB; Resource release failures in the source eNB handover-related signaling failures and timer expirations between the source and target eNB; Internal failures of the handover processing procedures in the source and target eNB; User plane path switching failures; and other failures not related to the timing of the measurement report triggering handover. If handover parameter-related issues are detected, trigger act 330.

Proceeding to 330, observe PM and other indicators of handover-related issues to determine if the handover failures occur only during handovers to one cell or to all cells. Processing inputs include PM and other indicators related to handover success/failure rate for individual target cells (handover matrix). This includes PM and other indicators of call drops, call setup failures and Radio Link Failures occurring during handover procedures for individual target cells. Other as aspects includes PM and other indicators of call drops, call setup failures and Radio Link Failures occurring after handovers for individual target cells. This also includes PM and other indicators of call drops, call setup failures and Radio Link Failures occurring in the neighboring cells along with PM and other indicators related to low number of handovers compared to peer cells and compared to expectations for individual target cell. Actions can include determining if the handover issues are associated with a single or multiple target cells before triggering act 340.

At 340, handover issues are classified into the too early or too late category. Observing performance measurements (PM) and other indicators of handover-related issues due to too early handover and too late handover. Inputs for this aspect include PM related to measurement reports and other indicators of handover failures due to handover parameter settings. This can include classifying the detected issue as ea "too early handover" issue or a "too late handover" issue before further processing at 350.

Figure 4:
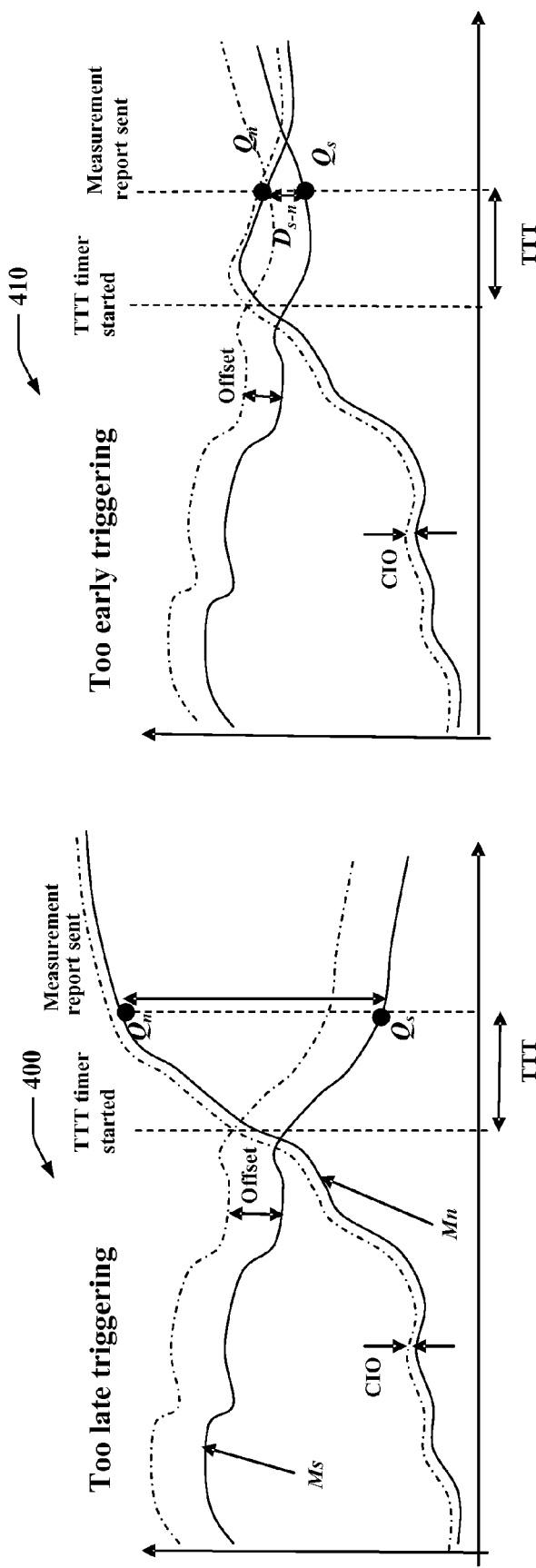
FIG. 4 illustrates example early and late handover timing diagrams for a wireless communication system.

Before proceeding with a discussion of act 350 of FIG. 3, FIG. 4 illustrates diagrams 400 and 410 which represent too early and too late handover timing scenarios respectively. As shown, TTT, CIO, and Offsets are represented in the diagrams 400 and 410 along with user equipment measurements of the signal strength of the strongest detected neighbor cell and serving cell, Mn and Ms, respectively. As shown, handover parameters, such as TTT, CIO, and Offsets determine the timing of the sending of the measurement reports by the user equipment to the network. In general, user equipment measurement reports to the network include UE measurements of the signal strength of serving cell and detected neighboring cells. The network uses such report data to initiate handovers of the user equipment from the serving cell to the detected neighboring cells. Such report data is also processed by act 340 described above.

The report includes at least the following information for each reported cell: Cell ID; and Received Quality of the cell. Optional information reported for each cell may include: Timing information of each cell; Location info of the UE at the time when the measurement report was created; and Information about the received quality of the reported cells is used to generate performance measurements indicating too early/too late handovers. The information that act 340 may compute from the data contained in measurement reports by the user equipment depicted in diagram 400 includes the difference between Mn and Ms when the report is sent (called Dn-s), the Ms when the report is sent (called Qs) and Mn when report is sent (called Qn). In one aspect, the too late handover condition may be detected when one or more of the following three conditions occur: 1) Dn-s is large compared to Offset; 2) Qs is low; 3) Qn is high. Possible automated actions for the too late condition include reducing TTT/Offset or increasing CIO, for example. For the too early scenario of diagram 410, it may be detected when one or more of the following conditions occur: 1) Dn-s is small (close to Offset); 2) Qs is not low; 3) Qn is not high. Possible automated actions include increasing TTT/Offset or reducing the CIO.

The following provides a brief description of example performance measurements, where the eNB should compute the following: Difference between the quality of the neighbor cell triggering event and quality of the serving cell when measurement report is sent; Quality of the serving cell when measurement report is sent; and the Quality of the neighbor cell triggering event when measurement report is sent. The following PMs (counters) should be computed by the eNB: Average, maximum, minimum value of the three quantities listed above (e.g., TTT, CIO, Offset), Standard Deviation of the three quantities listed above, and PDF of the three quantities.

The following describes exemplary performance measurement data and it is to be appreciated that the list is not exhaustive of all the possibilities. The PM parameters include: PM1$a$—Average quality of the serving cell. This PM is aggregated over measurement reports received in the serving cell; PM1$b$—Standard deviation of the quality of the serving cell. This PM is aggregated over measurement reports received in the serving cell; PM1$c$—PDF of the quality of the serving cell. This PM is aggregated over measurement reports received in the serving cell; PM2$a$—Average quality of the neighbor cell triggering event. This PM is aggregated over measurement reports received in the serving cell; and PM2$b$ Standard deviation of the quality of the neighbor cell triggering event. This PM is aggregated over measurement reports received in the serving cell. Other measurements include: PM2$c$—PDF of the quality of the neighbor cell triggering event. This PM is aggregated over measurement reports received in the serving cell; PM3$a$—Average difference between the quality of the neighbor cell triggering event and the quality of the serving cell. This PM is aggregated over measurement reports received in the serving cell; PM3$b$—Standard deviation of the difference between the quality of the neighbor cell triggering event and the quality of the serving cell. This PM is aggregated over all measurement reports received in the serving cell; PM3$c$—PDF of the difference between the quality of the neighbor cell triggering event and the quality of the serving cell. This PM is aggregated over measurement reports received in the serving cell.

Other performance measurement data includes: PM1$a\_n$—Average quality of the serving cell. This PM is computed over measurement reports triggered by neighbor cell n for each neighbor cell that triggered reports; PM1$b\_n$—Standard deviation of the quality of the serving cell. This PM is computed over measurement reports triggered by neighbor cell n for each neighbor cell that triggered reports; PM1$c\_n$—PDF of the quality of the serving cell. This PM is computed over measurement reports triggered by neighbor cell n for each neighbor cell that triggered reports; PM2$a\_n$—Average quality of the neighbor cell triggering the measurement report for event. This PM is computed over measurement reports triggered by neighbor cell n for each neighbor cell that triggered reports; PM2$b\_n$—Standard deviation of the quality of the neighbor cell triggering event. This PM is computed over measurement reports triggered by neighbor cell n for each neighbor cell that triggered reports. Other measurement include: PM2$c\_n$—PDF of the quality of the neighbor cell triggering event. This PM is computed over measurement reports triggered by neighbor cell n for each neighbor cell that triggered reports; PM3$a\_n$—Average difference between the quality of the neighbor cell triggering event and the quality of the serving cell. This PM is computed over measurement reports triggered by neighbor cell n for each neighbor cell that triggered reports; PM3$b\_n$—Standard deviation of the difference between the quality of the neighbor cell triggering event and the quality of the serving cell. This PM is computed over measurement reports triggered by neighbor cell n for each neighbor cell that triggered reports; and PM3$c\_n$—PDF of the difference between the quality of the neighbor cell triggering event and the quality of the serving cell. This PM is computed over measurement reports triggered by neighbor cell n for each neighbor cell that triggered reports.

Proceeding back to FIG. 3, the following describes an example decision matrix that may be processed by act 340 of FIG. 3, where handover related issues to multiple target cells may be identified as PM3$a$ (noted above) is high or PM1$a$ is low, where low and high can be determined by comparison to thresholds. For single target cells, PM3$a\_n$ is high or PM1$a\_n$ is detected low. Similarly, for too early conditions, PM3$a$ is detected low or PM2$a$ is low for multiple target cells. For single target cells, PM3$a\_n$ is low or PM2$a\_n$ is high, for example.

Figure 12:
FIG. 12 is a diagram of an example decision matrix for automated handover parameter processing.

Proceeding to 350 of FIG. 3, determine the handover parameters in which to dynamically optimize. This includes determining the parameter whose optimization has the highest priority by observing and processing PM based on measurement reports. Inputs for this processing stage include PMs noted above; and other indicators of handover failures due to handover parameter settings, where actions include select one of the parameters to be optimized such as Offset, TTT, and CIO, for example. FIG. 12 illustrates an example processing diagram 1200 or decision matrix that can be processed at act 350 to control early and late handovers. The diagram 1200 illustrates example parameter settings and decisions to facilitate reliable handovers.

Figure 5:
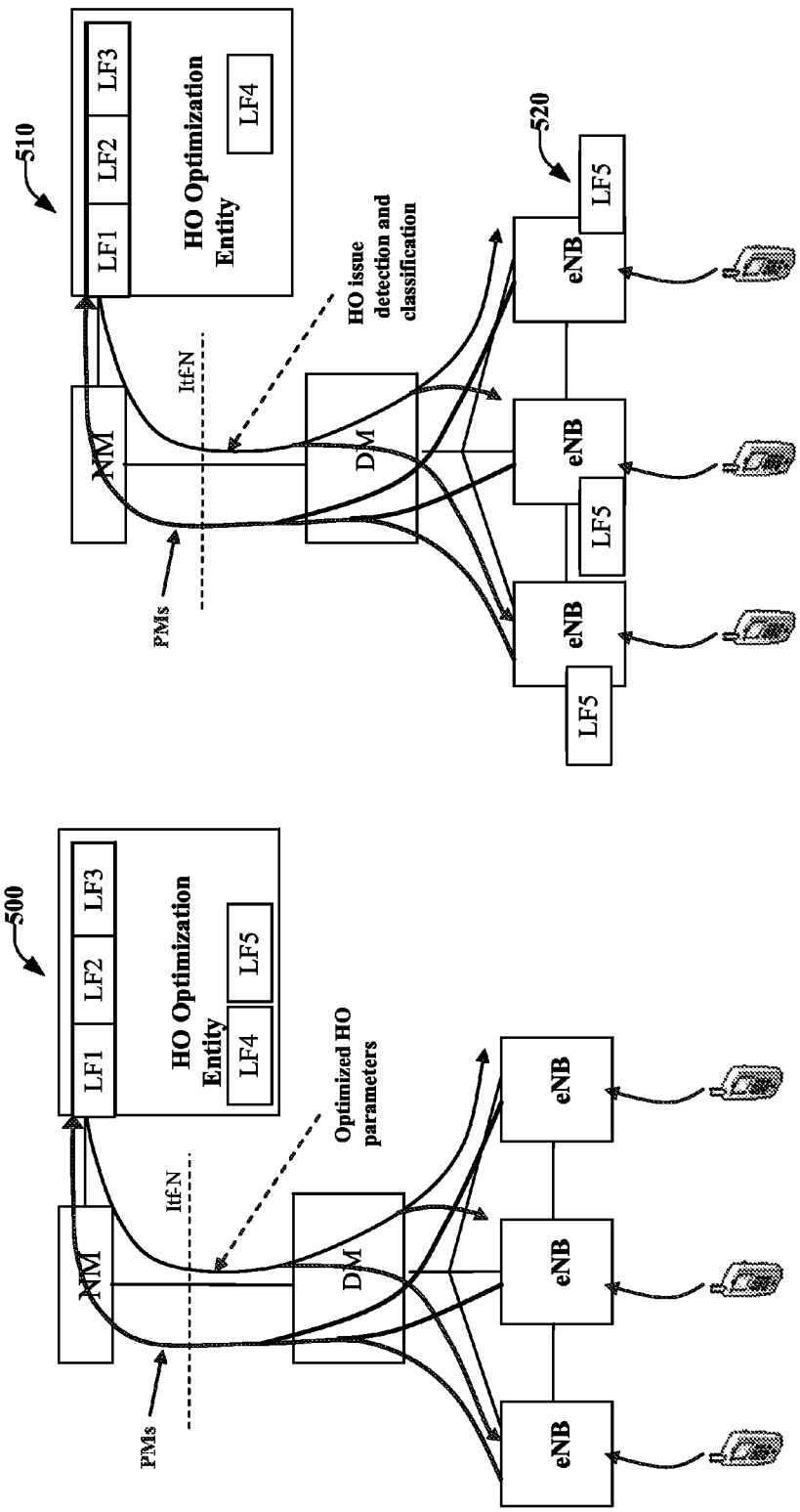
FIG. 5 is a diagram of alternative processing options for a wireless communications system.

FIG. 5 illustrates alternative processing options for a wireless communications system. In this aspect, a system 500 illustrates that the processes or logical functions depicted in FIG. 3 (acts 310-350) can be executed by a singular network entity. As can be appreciated however, various other arrangements are possible. For example, at 510, acts 310-340 of FIG. 3 are automatically executed by the network entity and act 350 is executed by eNB's at 520. As noted previously, still other arrangements are possible. For example, all or portions of the process 300 could be executed at the eNB's and/or in other network devices such as the user equipment.

The techniques processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
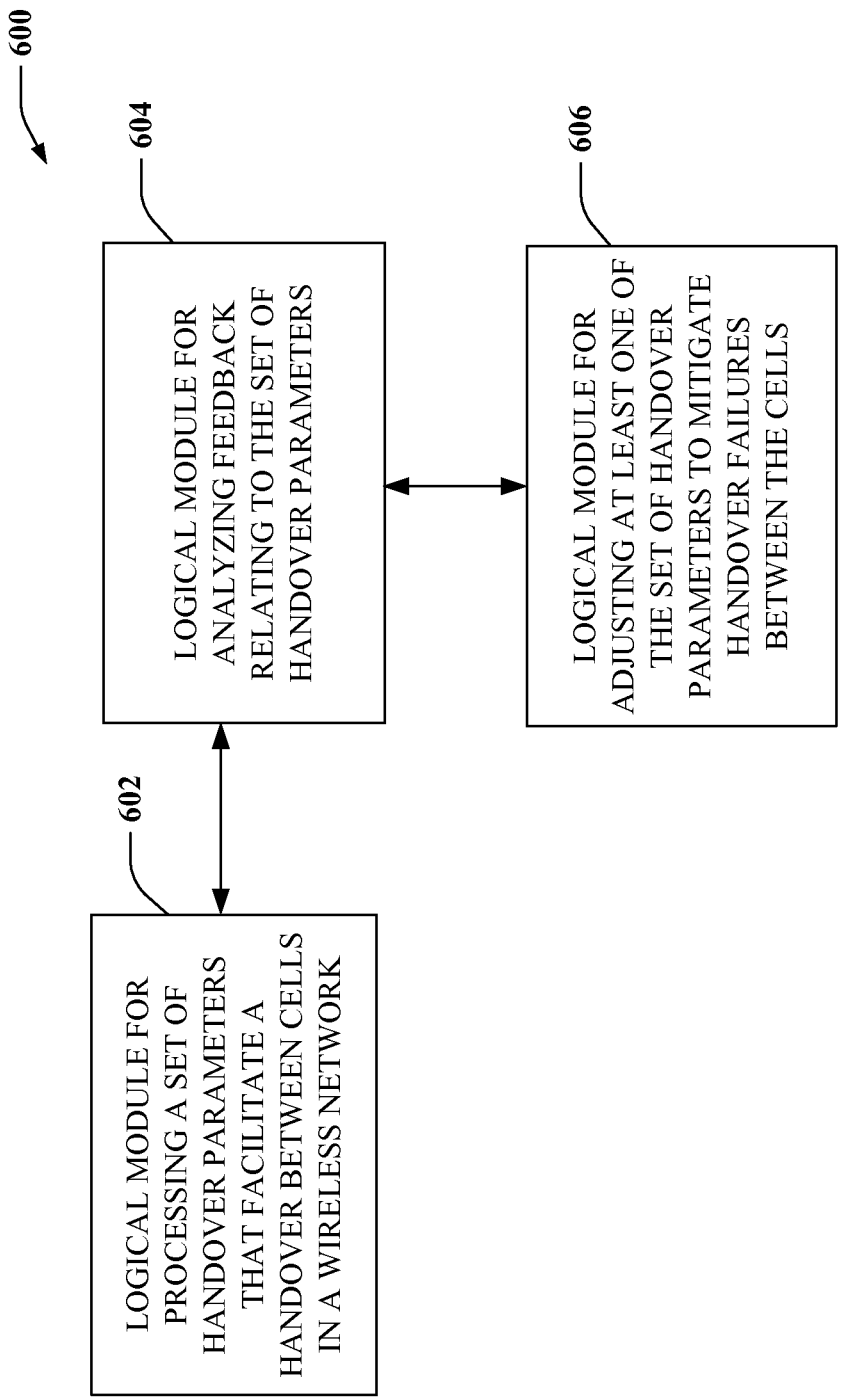
FIG. 6 illustrates an example logical module for automatic handover processing
Figure 7:
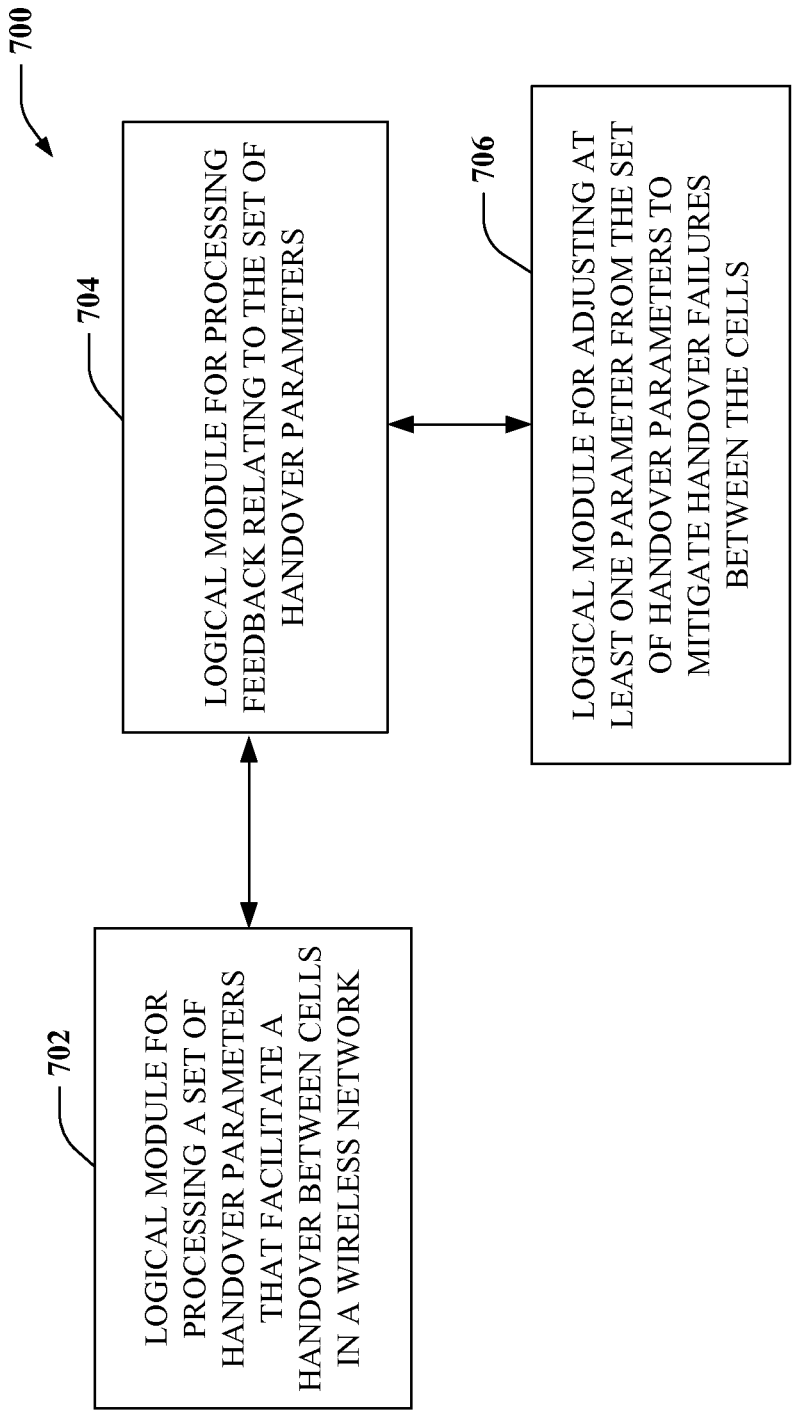
FIG. 7 illustrates an example logical module for alternative handover processing.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 or means for processing a set of handover parameters that facilitate a handover between cells in a wireless network and a logical module 604 or means for analyzing feedback relating to the set of handover parameters. This includes a logical module 606 or means for adjusting at least one of the set of handover parameters to mitigate handover failures between the cells.

Referring to FIG. 7, a wireless communication system 700 is provided. The system 700 includes a logical module 702 or means for processing a set of handover parameters that facilitate a handover between cells in a wireless network and a logical module 704 or means for processing feedback relating to the set of handover parameters. This includes a logical module 706 or means for adjusting at least one parameter from the set of handover parameters to mitigate handover failures between the cells.

In another aspect, a method for wireless communications is provided. The method includes analyzing a set of handover parameters; and dynamically adjusting at least one parameter from the set of handover parameters to mitigate failures relating to handovers between the cells. The set of handover parameters include time-to-trigger (TTT), an offset for a serving cell, a Cell Individual Offset (CIO), a cell-specific offset of a neighbor cell (OFS), a cell-specific offset of a serving cell (OCS), or a hysteresis parameter for an event. This includes detecting one or more failures relating to handovers that occur too early or handovers that occur too late, where early and late is defined by analyzing measurement reports or performance indicators and comparing to thresholds. Handovers that occur too early or too late are determined by analyzing a signal strength of a neighbor cell or a serving cell, Mn and Ms, respectively. The method includes analyzing call drops, call setup failures, alarms, or radio link failures before, during, or after handover procedures and isolating failures relating to handovers due to resource reservations failures, resource release failures, signaling failures, timer expirations, internal failures, or plane path switching failures. This includes analyzing handover according to a single cell model or a multiple cell model or analyzing performance measurements and performance indicators to determine if handover failures are related to a single cell or to multiple cells. The method includes reducing a time-to-trigger parameter to mitigate late triggering of a handover; reducing an offset parameter to mitigate late triggering of a handover; increasing a Cell Individual Offset (CIO) parameter to mitigate late triggering of a handover; increasing a time-to-trigger parameter to mitigate early triggering of a handover; increasing an offset parameter to mitigate early triggering of a handover; and decreasing a Cell Individual Offset (CIO) parameter to mitigate early triggering of a handover. This also includes analyzing a maximum, minimum, an average, or a standard deviation value for the set of handover parameters to automatically determine parameter settings.

In another aspect, a communications apparatus is provide that includes a memory that retains instructions for processing a set of handover parameters and automatically adjusting one or more parameters from the set of handover parameters to mitigate failures associated with handovers between the cells. The apparatus includes a processor that executes the instructions. This can include analyzing feedback that is related to a time-to-trigger (TTT), an offset for a serving cell, a Cell Individual Offset (CIO), a cell-specific offset of a neighbor cell (OFS), a cell-specific offset of a serving cell (OCS), or a hysteresis parameter for an event, where the feedback includes a parameter that is indirectly controlled by at least one other parameter. This can include instructions that automatically increase or decrease a timing value for the handover parameters in view of the measurement report. This can include analyzing a timing value or one or more handover failures to determine a parameter setting.

In another aspect, a computer program product is provided. This includes a computer-readable medium that includes code for managing handovers, the code includes: code for causing a computer to analyze a set of handover parameters; code for causing a computer to determine a desired range for the parameters; and code for causing a computer to increase or decrease the parameters within the range in order to adjust when a handover occurs. This includes code for causing a computer to adjust how early or how late a handover occurs.

In another aspect, a processor is provided that executes the following instructions: analyzing a set of handover parameters; determining a desired range for the parameters; and increasing or decreasing the parameters within the range in order to adjust when a handover occurs. This includes analyzing timing of an event to automatically determine a setting for the parameters.

In yet another aspect, a method for wireless communications is provided. The method includes processing a set of handover parameters; and automatically adjusting at least one parameter from the set of handover parameters to mitigate failures relating to handover between the cells.

In another aspect, a communications apparatus includes a memory that retains instructions for processing a set of handover parameters; and automatically adjusting one or more parameters from the set of handover parameters to mitigate failures related to handovers between the cells. This includes a processor that executes the instructions.

In another aspect, a computer program includes code for causing a computer to generate a set of handover parameters; code for causing a computer to process a desired range for the parameters; and code for causing a computer to increase or decrease the parameters within the range in order to adjust when a handover occurs.

In yet another aspect, a processor that executes the following instructions: analyzing a desired range for one or more handover parameters; and automatically increasing or decreasing values for the handover parameters in order to adjust when a handover occurs.

Figure 8:
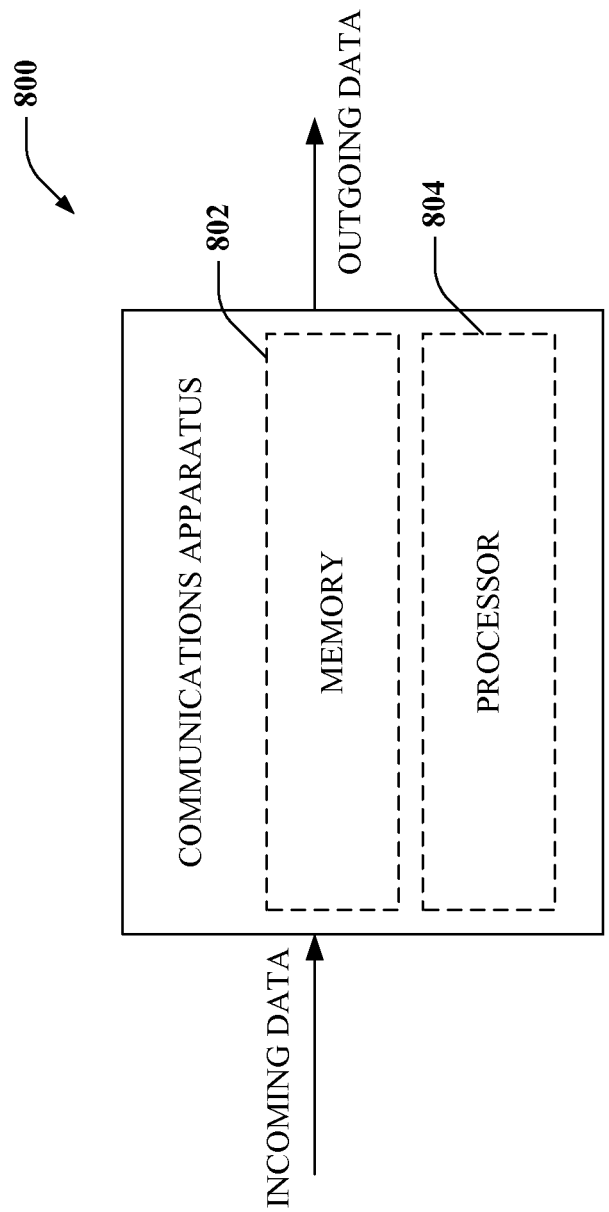
FIG. 8 illustrates an example communications apparatus that employ automatic handover processes.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
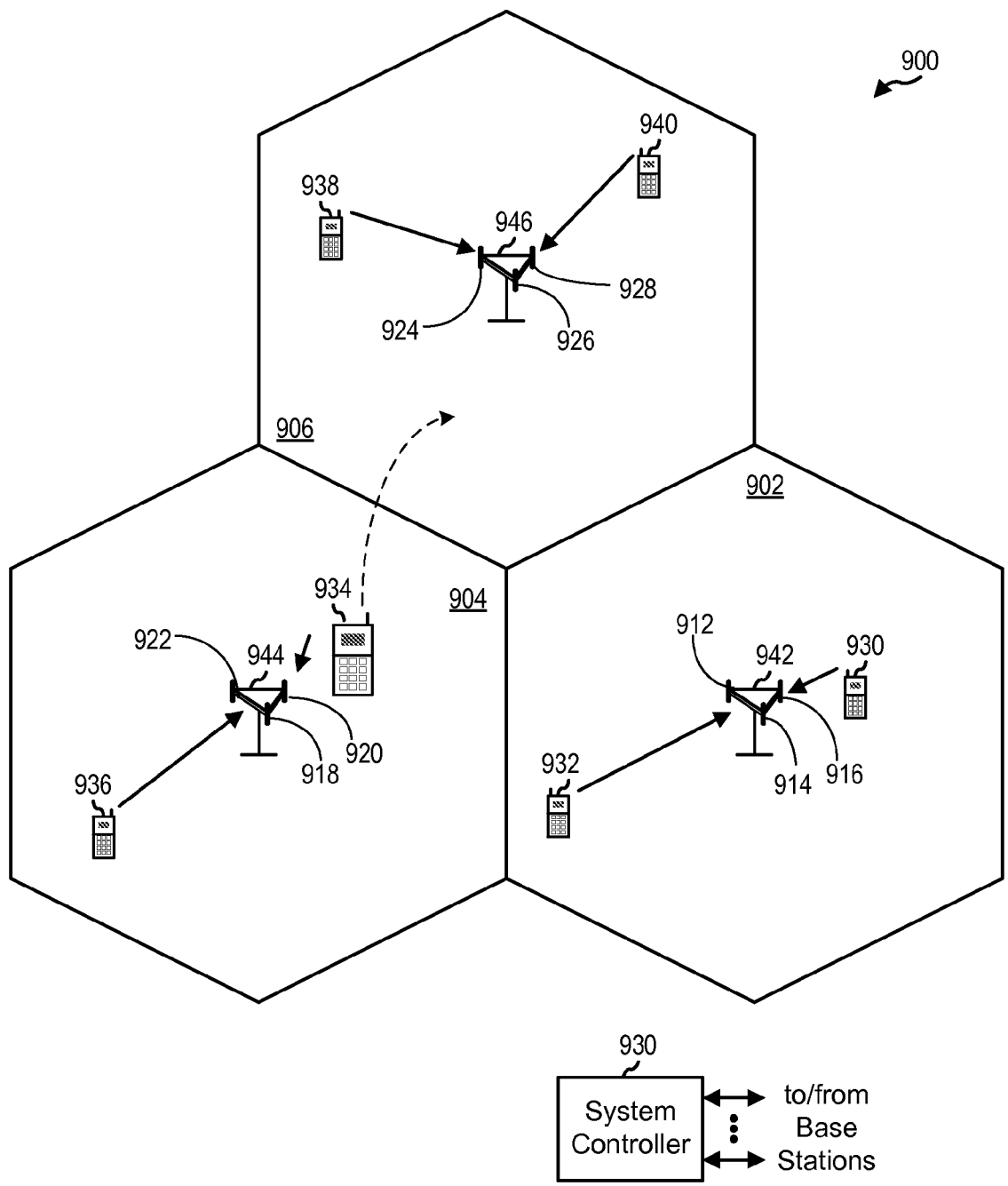
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
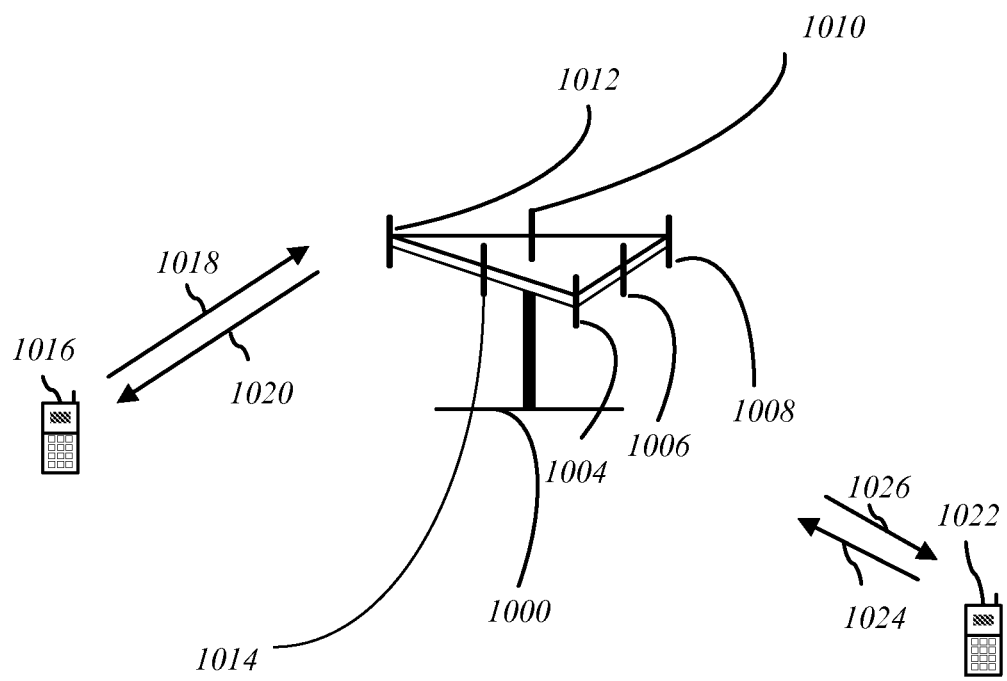
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
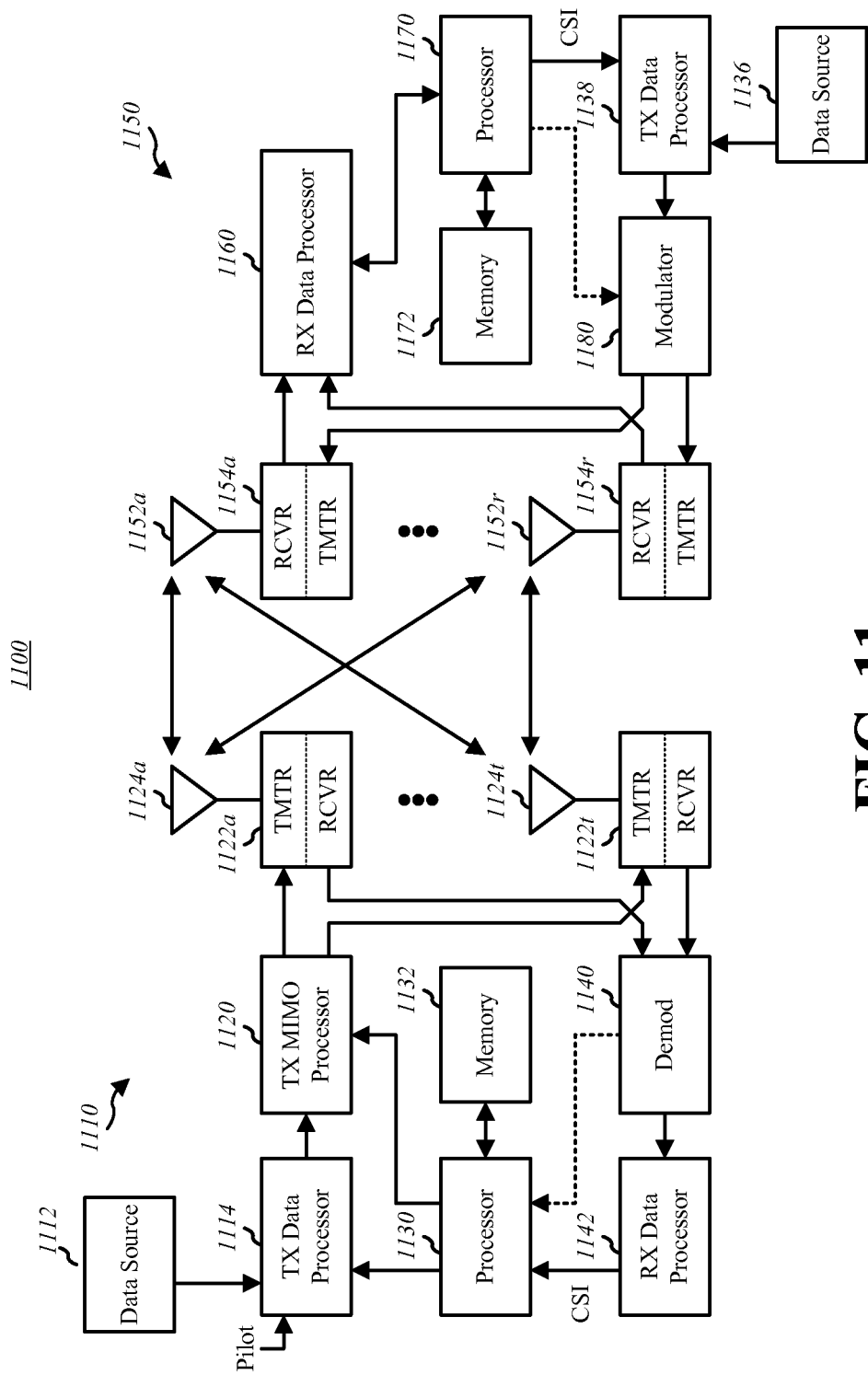

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
generating, by a network device, performance measurements relating to a handover failure rate in a wireless communications system;
analyzing, based on measurement reports from user equipment, a set of handover parameters corresponding to the performance measurements; and
dynamically adjusting, by the network device, at least one parameter from the set of handover parameters to mitigate failures relating to handovers between cells,
wherein the set of handover parameters include time-to-trigger (TTT), an offset for a serving cell, a Cell Individual Offset (CIO), a cell-specific offset of a neighbor cell (OFS), a cell-specific offset of a serving cell (OCS), or a hysteresis parameter for an event.

2. A method for wireless communications, comprising:
generating, by a network device, performance measurements relating to a handover failure rate in a wireless communications system;
analyzing, based on measurement reports from user equipment, a set of handover parameters corresponding to the performance measurements;
dynamically adjusting, by the network device, at least one parameter from the set of handover parameters to mitigate failures relating to handovers between cells; and
detecting one or more failures relating to handovers that occur too early or handovers that occur too late, where early and late is defined by analyzing measurement reports or performance indicators and comparing to thresholds.

3. The method of claim 2, where handovers that occur too early or too late are determined by analyzing a signal strength of a neighbor cell or a serving cell, Mn and Ms, respectively.

4. The method of claim 2, further comprising analyzing call drops, call setup failures, alarms, or radio link failures before, during, or after handover procedures.

5. The method of claim 1, further comprising isolating failures relating to handovers due to resource reservations failures, resource release failures, signaling failures, timer expirations, internal failures, or plane path switching failures.

6. The method of claim 1, further comprising analyzing handover according to a single cell model or a multiple cell model.

7. The method of claim 6, further comprising analyzing measurement reports and performance indicators to determine if handover failures are related to a single cell or to multiple cells.

8. The method of claim 1, further comprising reducing a time-to-trigger parameter to mitigate late triggering of a handover.

9. The method of claim 1, further comprising reducing an offset parameter to mitigate late triggering of a handover.

10. The method of claim 1, further comprising increasing a Cell Individual Offset (CIO) parameter to mitigate late triggering of a handover.

11. The method of claim 1, further comprising increasing a time-to-trigger parameter to mitigate early triggering of a handover.

12. The method of claim 1, further comprising increasing an offset parameter to mitigate early triggering of a handover.

13. The method of claim 1, further comprising decreasing a Cell Individual Offset (CIO) parameter to mitigate early triggering of a handover.

14. The method of claim 1, further comprising analyzing a maximum, minimum, an average, or a standard deviation value for the set of handover parameters to automatically determine parameter settings.

15. A communications apparatus, comprising:
a memory that retains instructions for:
generating, by the communications apparatus, performance measurements relating to a handover failure rate in a wireless communications system;
processing, based on based on measurement reports from user equipment, a set of handover parameters corresponding to the performance measurements; and
automatically adjusting by the communications apparatus one or more parameters from the set of handover parameters to mitigate failures associated with handovers between cells,
wherein the set of handover parameters include time-to-trigger (TTT), an offset for a serving cell, a Cell Individual Offset (CIO), a cell-specific offset of a neighbor cell (OFS), a cell-specific offset of a serving cell (OCS), or a hysteresis parameter for an event; and
a processor that executes the instructions.

16. A communications apparatus, comprising:
a memory that retains instructions for:
generating, by the communications apparatus, performance measurements relating to a handover failure rate in a wireless communications system;
processing, based on based on measurement reports from user equipment, a set of handover parameters corresponding to the performance measurements;
automatically adjusting by the communications apparatus one or more parameters from the set of handover parameters to mitigate failures associated with handovers between cells; and
detecting one or more handover failures relating to handovers that occur too early or handovers that occur too late, where early and late is defined by analyzing measurement reports and comparing data from the measurement reports to thresholds; and
a processor that executes the instructions.

17. The communications apparatus of claim 16, further comprising instructions to analyze a measurement report to determine settings for one or more handover parameters.

18. The communications apparatus of claim 17, further comprising instructions that automatically increase or decrease a timing value for the one or more handover parameters in view of the measurement report.

19. A communications apparatus, comprising:
means for generating, by the communications apparatus, performance measurements relating to a handover failure rate in a wireless communications system;
means for processing, based on measurement reports from user equipment, a set of handover parameters that facilitate a handover between cells in a wireless network, wherein the set of handover parameters correspond to the performance measurements;
means for analyzing feedback relating to the set of handover parameters; and
means for adjusting at least one of the set of handover parameters to mitigate failures relating to handovers between the cells,
wherein the feedback is related to a time-to-trigger (TTT), an offset for a serving cell, a Cell Individual Offset (CIO), a cell-specific offset of a neighbor cell (OFS), a cell-specific offset of a serving cell (OCS), or a hysteresis parameter for an event.

20. The communications apparatus of claim 19, the feedback further comprising a parameter that is indirectly controlled by at least one other parameter.

21. A computer program product comprising:
a non-transitory computer-readable medium that includes code for managing handovers, the code comprising:
code for causing a computer to generate performance measurements relating to a handover failure rate in a wireless communications system;
code for causing a computer to analyze, based on measurement reports from user equipment, a set of handover parameters corresponding to the performance measurements;
code for causing a computer to determine a range for the set of handover parameters;
code for causing a computer to increase or decrease the handover parameters within the range in order to adjust when a handover occurs; and
code for causing a computer to adjust how early or how late a handover occurs.

22. A method for wireless communications, comprising:
generating, by a network device, performance measurements relating to a handover failure rate in a wireless communications system;
processing, based on measurement reports from user equipment, a set of handover parameters corresponding to the performance measurements; and
automatically adjusting at least one parameter from the set of handover parameters to mitigate failures relating to handover between cells,
wherein the set of handover parameters include time-to-trigger (TTT), an offset for a serving cell, a Cell Individual Offset (CIO), a cell-specific offset of a neighbor cell (OFS), a cell-specific offset of a serving cell (OCS), or a hysteresis parameter for an event.

23. A method for wireless communications, comprising:
generating, by a network device, performance measurements relating to a handover failure rate in a wireless communications system;
processing, based on measurement reports from user equipment, a set of handover parameters corresponding to the performance measurements;
automatically adjusting at least one parameter from the set of handover parameters to mitigate failures relating to handover between cells; and
detecting one or more handover failures relating to handovers that occur too early or handovers that occur too late, where early and late is defined by analyzing measurement reports and comparing data from the measurement reports to timing thresholds.

24. The method of claim 23, further comprising reducing a time-to-trigger parameter, reducing an offset parameter to mitigate late triggering of a handover, or increasing a Cell Individual Offset (CIO) parameter to mitigate late triggering of a handover.

25. The method of claim 23, further comprising increasing a time-to-trigger parameter, increasing an offset parameter to mitigate early triggering of a handover, or decreasing a Cell Individual Offset (CIO) parameter to mitigate early triggering of a handover.

26. A communications apparatus, comprising:
a memory that retains instructions for:
generating, by the communications apparatus, performance measurements relating to a handover failure rate in a wireless communications system;

processing, based on measurement reports from user equipment, a set of handover parameters corresponding to the performance measurements; and automatically adjusting one or more parameters from the set of handover parameters to mitigate failures related to handovers between cells, wherein the set of handover parameters include time-to-trigger (TTT), an offset for a serving cell, a Cell Individual Offset (CIO), a cell-specific offset of a neighbor cell (OFS), a cell-specific offset of a serving cell (OCS), or a hysteresis parameter for an event; and a processor that executes the instructions.

27. A communications apparatus, comprising:

means for generating, by a network device, performance measurements relating to a handover failure rate in a wireless communications system;

means for processing, based on measurement reports from user equipment, a set of handover parameters that facilitate a handover between cells in a wireless network;

means for processing feedback relating to the set of handover parameters, wherein the set of handover parameters correspond to the performance measurements; and means for adjusting at least one parameter from the set of handover parameters to mitigate failures related to handovers between the cells, wherein the feedback is related to a time-to-trigger (TTT), an offset for a serving cell, a Cell Individual Offset (CIO), a cell-specific offset of a neighbor cell (OFS), a cell-specific offset of a serving cell (OCS), or a hysteresis parameter for an event.

28. A computer program product comprising:

a non-transitory computer-readable medium that includes code for managing handovers, the code comprising:

code for causing a computer to generate performance measurements relating to a handover failure rate in a wireless communications system;

code for causing a computer to generate, based on measurement reports from user equipment, a set of handover parameters corresponding to the performance measurements;

code for causing a computer to process a range for the set of handover parameters code for causing a computer to increase or decrease the handover parameters within the range in order to adjust when a handover occurs; and code for causing a computer to adjust how early or how late a handover occurs.

* * * * *